United States Patent
Linz (10) Patent No.: US 6,621,831 B1
(45) Date of Patent: Sep. 16, 2003

(54) METHOD AND APPARATUS FOR VERIFYING AND CORRECTING CONNECTIVITY

(75) Inventor: Alfredo R. Linz, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/225,387

(22) Filed: Jan. 5, 1999

(51) Int. Cl.[7] .............................................. H04J 12/66
(52) U.S. Cl. ........................ 370/480; 370/216; 370/254
(58) Field of Search ................. 370/493, 494, 370/495, 496, 497, 525, 526, 282, 296, 351–356, 400–402, 480, 216, 254; 379/414, 93.05, 399, 399.01, 399.02; 375/222

(56) References Cited

U.S. PATENT DOCUMENTS

| | | | | |
|---|---|---|---|---|
| 5,889,856 A | * | 3/1999 | O'Toole et al. | 379/399 |
| 6,088,368 A | * | 11/2000 | Rubinstain et al. | 370/480 |
| 6,192,109 B1 | * | 2/2001 | Amrany et al. | 379/30 |
| 6,246,695 B1 | * | 12/2001 | Seazhotz et al. | 370/468 |

* cited by examiner

*Primary Examiner*—Ricky Ngo
(74) *Attorney, Agent, or Firm*—Williams Morgan & Amerson P.C.

(57) ABSTRACT

A method and apparatus are provided. The method includes providing an enable signal to a configuration device for generating a preselected signal, providing the preselected signal to a peer station over a subscriber line, and adjusting a transmission path of a signal to the peer station through the subscriber line in response to the preselected signal.

11 Claims, 6 Drawing Sheets

METHOD AND APPARATUS FOR VERIFYING AND CORRECTING CONNECTIVITY

BACKGROUND OF THE INVENTION

1. Field of the Invention

This invention relates generally to transmission of signals, and, more particularly, to verifying and correcting error in transmission path of signals.

2. Description of the Related Art

The telecommunications sector is undergoing a major metamorphosis. The change has been induced by three primary factors. First is the growing number of users demanding more bandwidth for faster data transmission. Second is the congestion in the Plain Old Telephone Service (POTS), designed for transmission of voice signals in analog form. Third is the Telecommunications Reform Act, which is fostering broader competition through deregulation. All three of the aforementioned factors call for a more effective and efficient means for transporting data at high speeds.

To meet the demand for high-speed communication, designers are seeking innovative and cost-effective solutions that take advantage of the existing network infrastructure. Several technological advancements have been made in the telecommunications industry that make use of the existing network of telephone wires. The most promising of these technologies is the Digital Subscriber Line (DSL) technology.

DSL is making the existing network of telephone lines more robust and versatile. Once considered virtually unusable for broadband communications, an ordinary twisted pair equipped with DSL interfaces can transmit videos, television, and very high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as one of the more promising and viable options.

There are now at least four popular versions of DSL technology, namely Asymmetrical Digital Subscriber Line (ADSL), Integrated Services Digital Network Digital Subscriber Line (IDSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. The variations of DSL technologies are commonly referred to as xDSL technology. Because xDSL technology is well known in the art, they will not be described in detail herein.

DSL, as well as its later siblings, is making it possible for users to communicate over normal telephone wires at a much faster rate than before. The different flavors of DSL will converge around specific market niches and applications. For example, home users may favor ADSL for uses such as video-on-demand and Internet access. On the other hand, small businesses could find IDSL attractive for telecommuting and high-speed data transmission. Large businesses might choose VDSL to deliver Internet traffic or limited multimedia traffic to large businesses. DSL technologies leave Plain Old Telephone Service undisturbed. Traditional analog voice band interfaces use the same frequency band, 0–4 Kilohertz (KHz), as telephone service, thereby preventing concurrent voice and data use. A DSL interface, on the other hand, operates at frequencies above the voice channels, from around 30 KHz to 1.1 Megahertz (MHz). Thus, a single DSL line is capable of offering simultaneous channels for voice and data.

DSL systems use digital signal processing (DSP) to increase throughput and signal quality through common copper telephone wire. It provides a downstream data transfer rate Iraq from the DSL Point-of-Presence (POP) to the subscriber location at speeds of up to 8 Mega-bits per second (MBPS). The transfer rate of 1.5 MBPS, for instance, is fifty times faster than a conventional 28.8 kilobits per second (KBPS).

Although DSL and POTS systems can co-exist on one line (e.g., also referred to as "subscriber line"), the xDSL traffic is not passed through the POTS circuitry due to the different bandwidth, voltage, and power needs between the two systems. The xDSL signal is typically driven onto the subscriber line by a separate driver than is the POTS signal because the two signals are very different. The xDSL signal has a lower voltage, wider bandwidth, and often requires a different number of bits of resolution when digitized.

Figure 1:
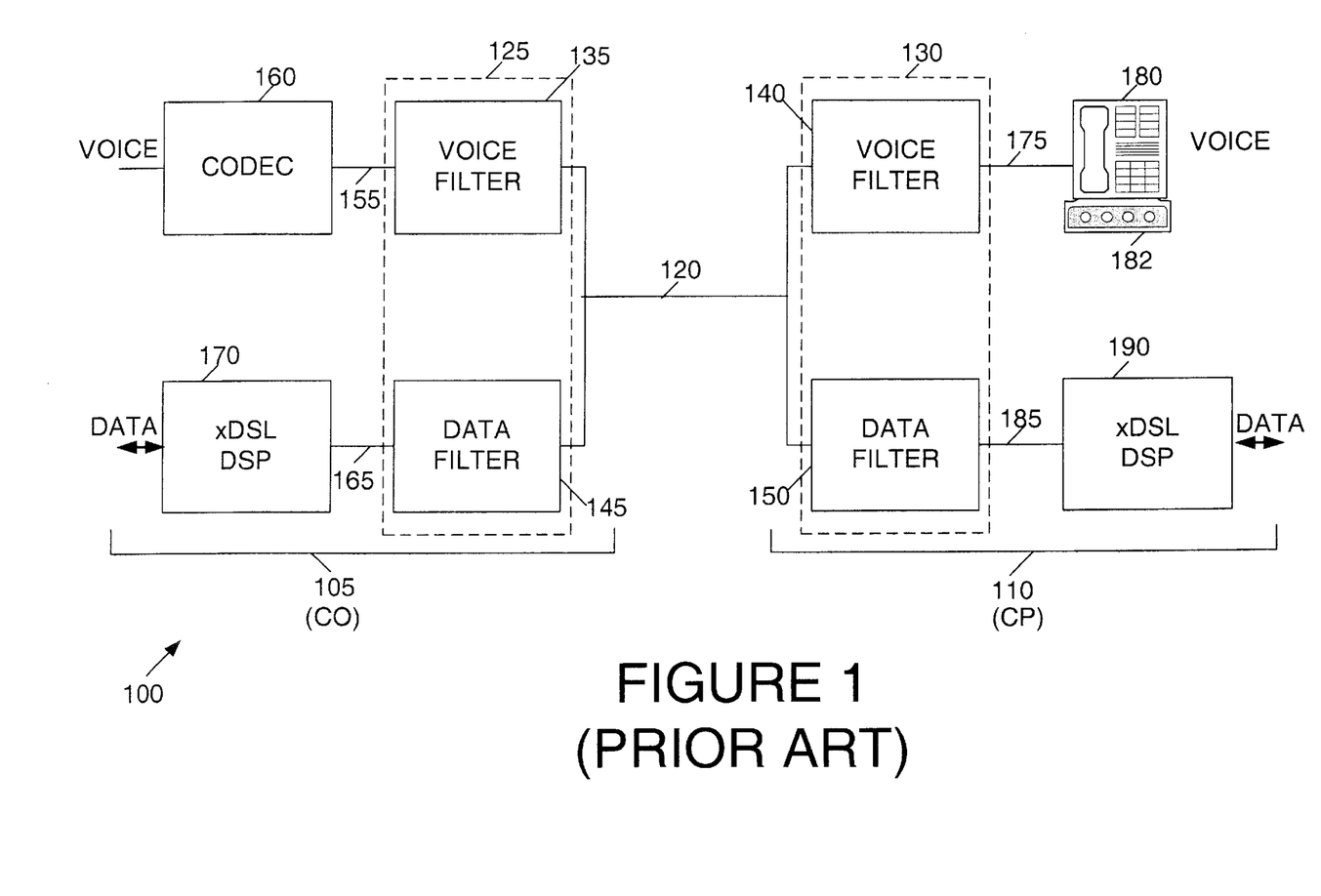
FIG. 1 is a stylized block diagram of a prior art connection of a communications system supporting voice and data communications.

FIG. 1 illustrates a stylized block diagram of a communications system 100 that supports both xDSL and POTS technology. The communications system 100 depicts a typical xDSL and POTS installation between a Customer Premise (CP) 110 and Central Office (CO) 105. A subscriber line 120 links the CO 105 to the CP 110. The transmission of data signals over the subscriber line 120 from the CO 105 to CP 110 is typically referred to as a "downstream" transmission and the transmission of data signals from the CP 110 to CO 105 as an "upstream" transmission.

As can be seen in FIG. 1, both the CP 110 and CO 105 utilize splitters 125, 130 to separate the different frequency bands that are transmitted over the subscriber line 120. In the illustrated communications system 100, the splitters 125, 130 separate the voice band frequencies from the data band frequencies. Accordingly, splitters 125, 130 comprise a voice filter 135, 140, which is typically a low-pass filter, and a data filter 145, 150, which is typically a high-pass filter. At the CO 105, the voice filter 135 substantially removes the data band frequencies from the signal on the subscriber line 120 before providing a signal on a line 155 to a CODEC 160. The data filter 145 at the CO 105, conversely, substantially removes the voice band frequencies and provides a signal on a line 165 to an xDSL processor 170. At the CP 110, the voice filter 140 substantially removes the data band frequencies from the signal on the subscriber line 120 before providing a signal on a line 175 to either a telephone 180 or a modem 182. The data filter 150 at the CP 110, conversely, substantially removes the voice band frequencies and provides a signal on a line 185 to an XDSL processor 190.

The communications system 100 of FIG. 1 suffers from several shortcomings in that it does not allow for an easy means to verify the connectivity between the CO 105 and CP 110, particularly with respect to the connectivity between the two xDSL processors 170, 190. Furthermore, the communications system 100 does not offer a quick and cost-efficient means for self-correcting the error, in case a connectivity error is detected. For example, one common connectivity error encountered is the incorrect installation of the splitters 125, 130, particularly the ones that are located at the CP 110. Splitters 125, 130 that are incorrectly installed (i.e. the connections to the data filter 145, 150 and the voice filter 135, 140 are reversed) prevent the voice/modem 180/182 and xDSL processor 170, 190 from receiving the voice and data band frequencies, respectively.

The present invention is directed to overcoming, or at least reducing the effects of, one or more of the problems set forth above.

SUMMARY OF THE INVENTION

In one aspect of the present invention, a method is provided. The method includes providing an enable signal to a configuration device for generating a preselected signal, providing the preselected signal to a peer station over a subscriber line, and adjusting a transmission path of a signal to the peer station through the subscriber line in response to the preselected signal.

In one aspect of the present invention, an apparatus having a first and second terminal is provided. The apparatus includes a first switching device, a second switching device, and a configuration device. The first switching device includes an enable input terminal and an output terminal connected to the first terminal of the apparatus. The first switching device is capable of connecting the second terminal of the apparatus in response to an enable signal. The second switching device includes an enable input terminal and an output terminal coupled to the second terminal of the apparatus, wherein the second switching device is capable of connecting to the first terminal of the apparatus in response to an enable signal. The configuration device includes an enable input terminal, wherein the configuration device is capable of transmitting a preselected signal over a subscriber line to a peer station. The configuration device is also capable of providing the enable signal to the enable input terminal of the first switching device and to the enable input terminal of the second switching device.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
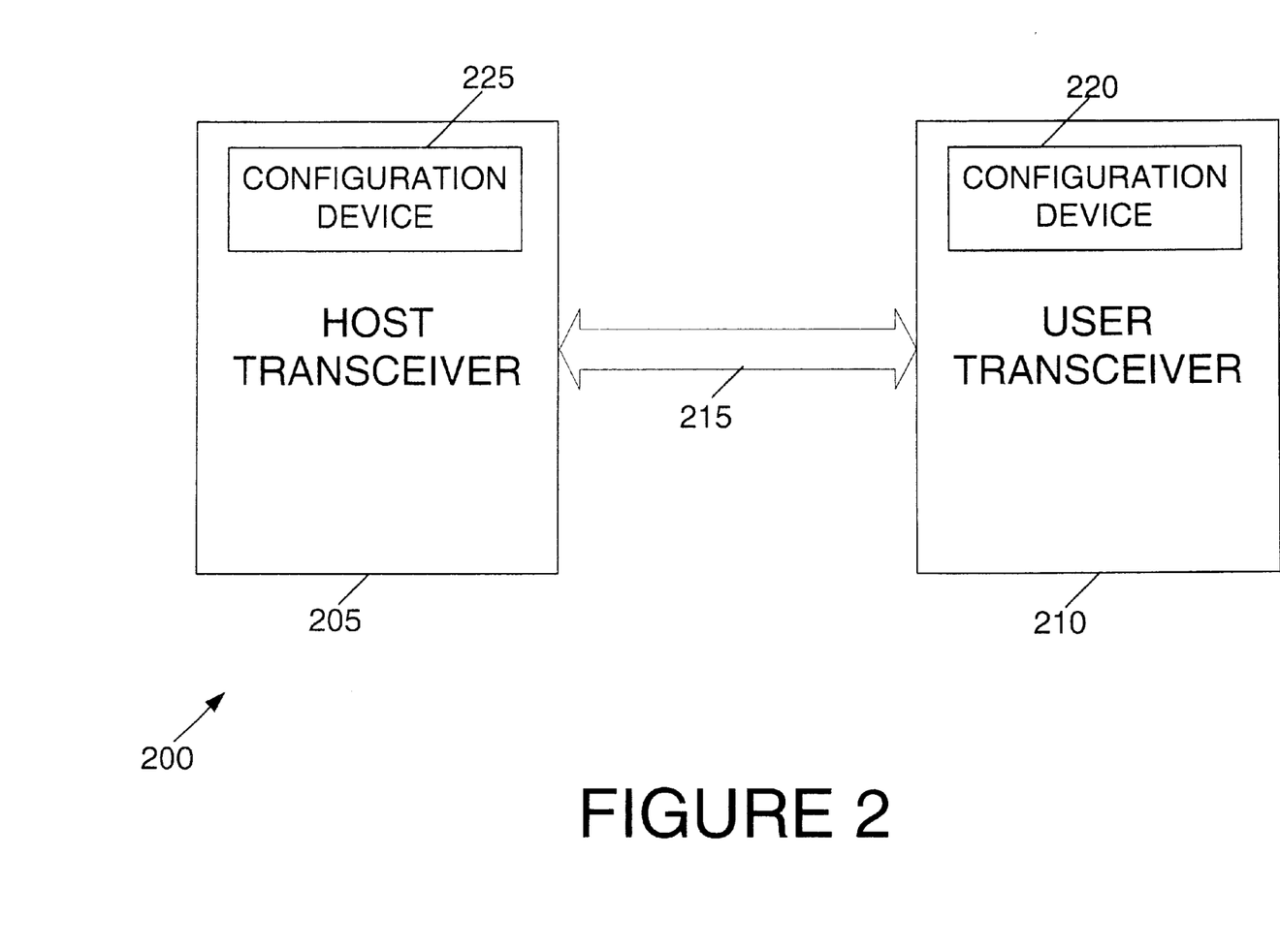
FIG. 2 is a stylized block diagram of a communications system in accordance with the present invention.

Referring now to the drawings, and in particular to FIG. 2, a communications system 200 in accordance with the present invention is illustrated. The communications system 200 includes a host transceiver 205 and a user transceiver 210 capable of communicating with each other over a connection 215. The connection 215 may be either a wireline connection or a wireless connection, depending on the application. In one embodiment, the host and user transceivers 205, 210 may be a pair of modems, fax machines, cellular telephones, or conventional telephones. The user transceiver 210 comprises a first configuration device 220 that communicates with a second configuration device 225 of the host transceiver 205 to adjust the connection configuration between the host and user transceiver 205, 210. And, in case of a connectivity failure, the first configuration device 220, in one embodiment, attempts to cure the failure. Although FIG. 2 illustrates the configuration devices 220, 225 as part of the transceivers 205, 210, it is contemplated that in alternative embodiments the configuration devices 220, 225 may be standalone devices.

Figure 3:
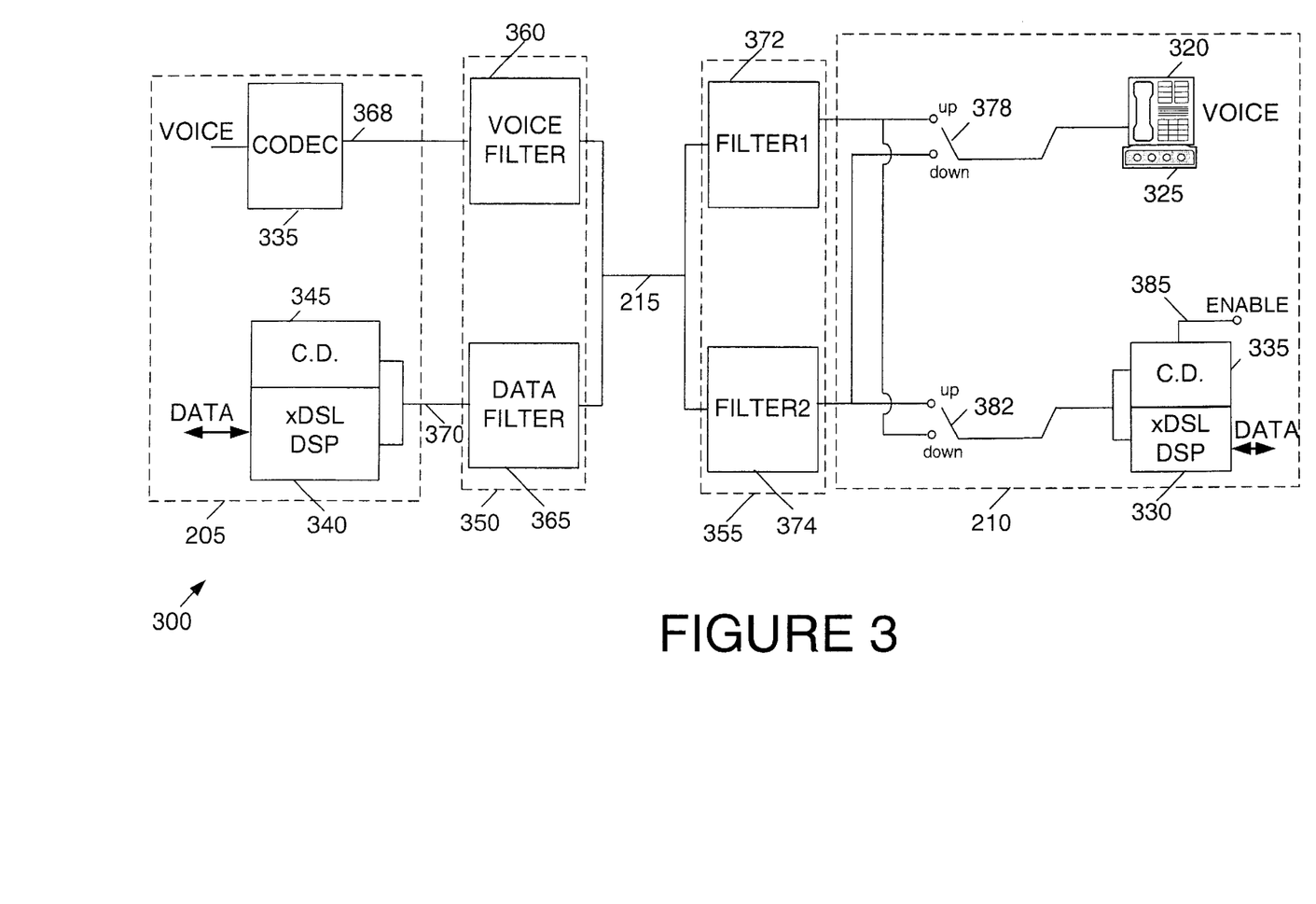
FIG. 3 is a stylized block diagram of a communications system supporting voice and data communication in accordance with the present invention.

FIG. 3 illustrates a stylized block diagram of a communications system 300 in accordance with the present invention. The communications system 300 includes the host and user transceivers 205, 210 that are capable of communicating with each other over the connection 215. In the illustrated embodiment, the connection is a subscriber line 215 which may be a Public Switched Telephone Network (PSTN) line, a Private Branch Exchange (PBX) line, or any other medium capable of transmitting signals. In the illustrated embodiment, however, the subscriber line 215 is a PSTN line that connects the host transceiver 205, which may be located at a central office (CO), to the user transceiver 210, which may be located at a customer premises (CP). The host and user transceivers 205, 210 in the illustrated embodiment support voice and data communications. Specifically, the user transceiver 210 includes a telephone 320, a modem 325, an xDSL processor 330, and a first configuration device 335. Although the illustrated embodiment of the user transceiver 210 includes the telephone 320, it is contemplated that in alternative embodiments the user transceiver 210, in lieu of the telephone 320, may have a telephone input terminal (not shown) adapted to interface with the telephone 320. The host transceiver 205 includes a CODEC 335 for processing signals from the telephone/modem 320/325, an xDSL processor 340 for processing data signals, and a second configuration device 345 for communication with the first configuration device 335. The xDSL processors 330, 340 may be ADSL processors, VDSL processors, and the like.

The user transceiver 210 communicates with the host transceiver 205 over the subscriber line 215 and through a first and second splitter 350, 355. The second splitter 350 comprises a voice and data filter 360, 365. The voice filter 360 substantially removes the data band frequencies from the subscriber line 215 and provides the filtered signal on line 368 to the CODEC 335. The data filter 365, conversely, substantially removes the voice band frequencies from the subscriber line 215 and provides the resulting signal on line 370 to the xDSL processor 340. The second configuration device 345 monitors the signal on the line 370 for any transmissions from the first configuration device 335.

The first splitter 355 comprises a first and second filter 372, 374. When connected properly, the first filter 372 is a voice filter that is coupled to the telephone/modem 320, 325, and the second filter 374 is a data filter that is coupled to the xDSL processor 330. When connected incorrectly, the connections to the first and second filters 372, 374 are reversed such that the xDSL processor 330 is connected to the voice filter 372 and the telephone/modem 320, 325 are connected to the data filter 374.

The user transceiver 210 includes a plurality of switching devices capable of adjusting the transmission paths the voice and data signals take from the user transceiver 215 to the host transceiver 215. The illustrated embodiment comprises a first and second switching device 378, 382. The inputs of the first and second switching devices 378, 382 are connected to the telephone/modem 320, 325 and to the XDSL processor 330, respectively. The outputs of the first and second switching devices 378, 382, as shown in their default positions (i.e., "up" position), are coupled to the first filter 372 and the second filter 374, respectively. In the "down" position, the connection to the switching devices 378, 382 is reversed such that the output of the first switching device 378 is connected to the second filter 374 and the output of the second switching device 382 is coupled to the first filter 372. The first configuration device 335 of the user transceiver 210 includes an enable input terminal that is capable of receiving an enable signal on line 385.

Figure 4:
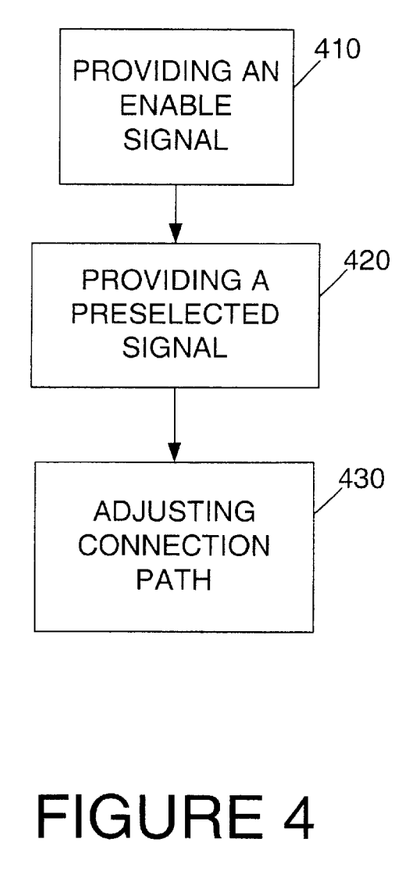
FIG. 4 is a method in accordance with the present invention that can be employed by the communications system of FIG. 3.

The communications system 300 of FIG. 3 employs a method of FIG. 4 to verify and possibly adjust, if necessary, the connectivity configuration between the user transceiver 210 and its peer transceiver, the host transceiver 205. The term "peer transceiver" as utilized herein refers to the transceiver that is receiving the data, and thus can be either the host transceiver 205 or the user transceiver 210, depending on which transceiver is receiving the data for a given time. The method of FIG. 4 begins at block 410, where an enable signal is provided to the first configuration device 335 on the line 385. In response to the enable signal, the first configuration device, at block 410, transmits a preselected signal to its counterpart, the second configuration device 345 of the host transceiver 205. The preselected signal may be any variety of signals that can be detected by the second configuration device 345. For example, in one embodiment, the preselected signal may be a high-frequency (e.g., within the data band) signal. In another embodiment, the preselected signal may be a dual tone multi-frequency (DTMF) sequence. At block 430, in response to the transmitting of the preselected signal, the first configuration device 335 adjusts the connection path to the host transceiver 205 through the subscriber line 215.

Figure 5:
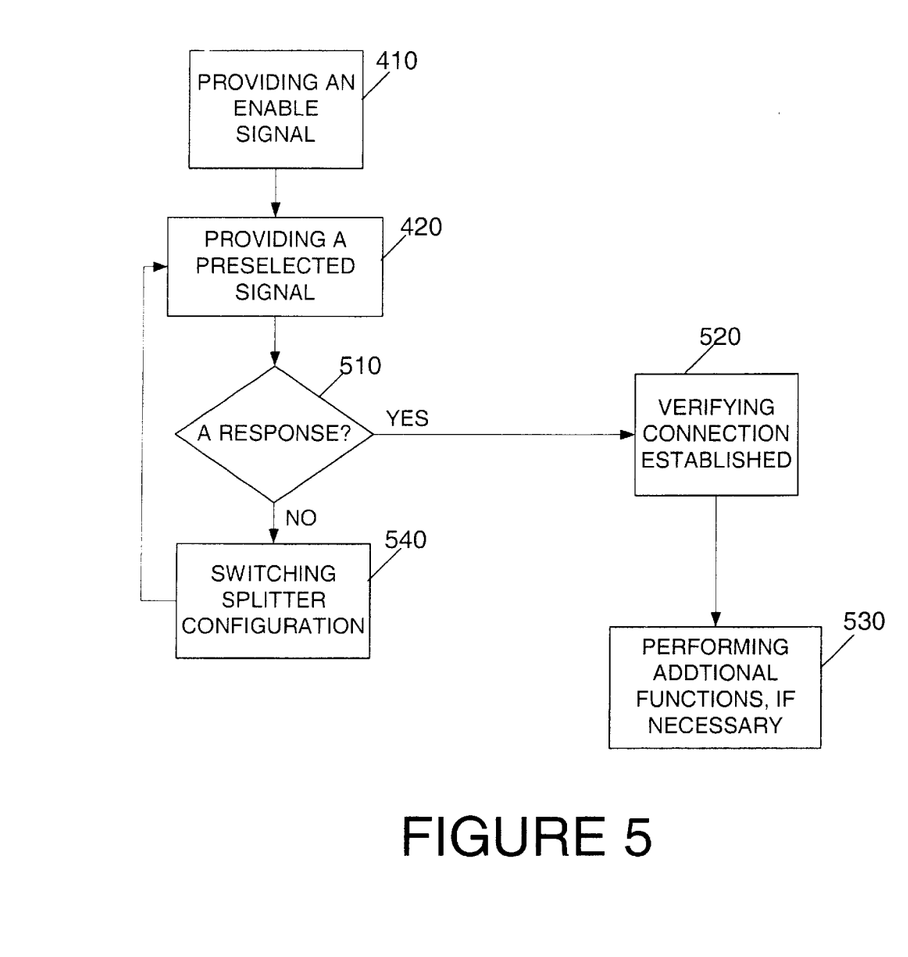
FIG. 5 is a specific method in accordance with the present invention that can be employed by the communications system of FIG. 3.

One specific embodiment of the method of FIG. 4 for adjusting the connection path for the data and voice signals to the host transceiver 205 is illustrated in FIG. 5. As can been seen by the use of like numerals, blocks 410 and 420 are identical to that of the method of FIG. 4, where the first configuration device 335 transmits a preselected signal in response to the enable signal on line 385. At block 510, the first configuration device 335 awaits a response from the second configuration device 345 in response to the preselected signal. If the first and second filters 372, 374 of the first splitter 355 are connected correctly to the telephone/modem 320, 325 and the xDSL transceiver 330, respectively, then the preselected signal should reach the second configuration device 345 successfully. Thus, assuming proper connection, the second configuration device 345, in response to the preselected signal, transmits an acknowledgement to the first configuration device 335. The first configuration device 335, at block 520, receives the acknowledgement and verifies that a proper connection has been established with the host transceiver 205. At block 520, after determining that a proper connection exists, the first configuration device 335 can perform additional tests or remotely configure the host transceiver 205. If, on the other hand, the filters 372, 374 are incorrectly connected (i.e., reversed), then the preselected signal will not reach the second configuration device 345 and, accordingly, the second configuration device 345 will not provide an acknowledgement. Assuming there is no acknowledgement from the second configuration device 345, then, at block 540, after waiting for a preselected interval, the first configuration device 335 places the first and second switches 378, 382 in a down position, thereby switching the configuration of the filters 372, 374 of the splitter 355. Then, at the block 420, the first configuration device 335 once again transmits a preselected signal to the second configuration device 345. Thus, if the preselected signal reaches the second configuration device 345 the second time, then the transmission paths from the user transceiver 210 to the host transceiver 205 is adjusted automatically, without any intervention from a service provider personnel.

Figure 6:
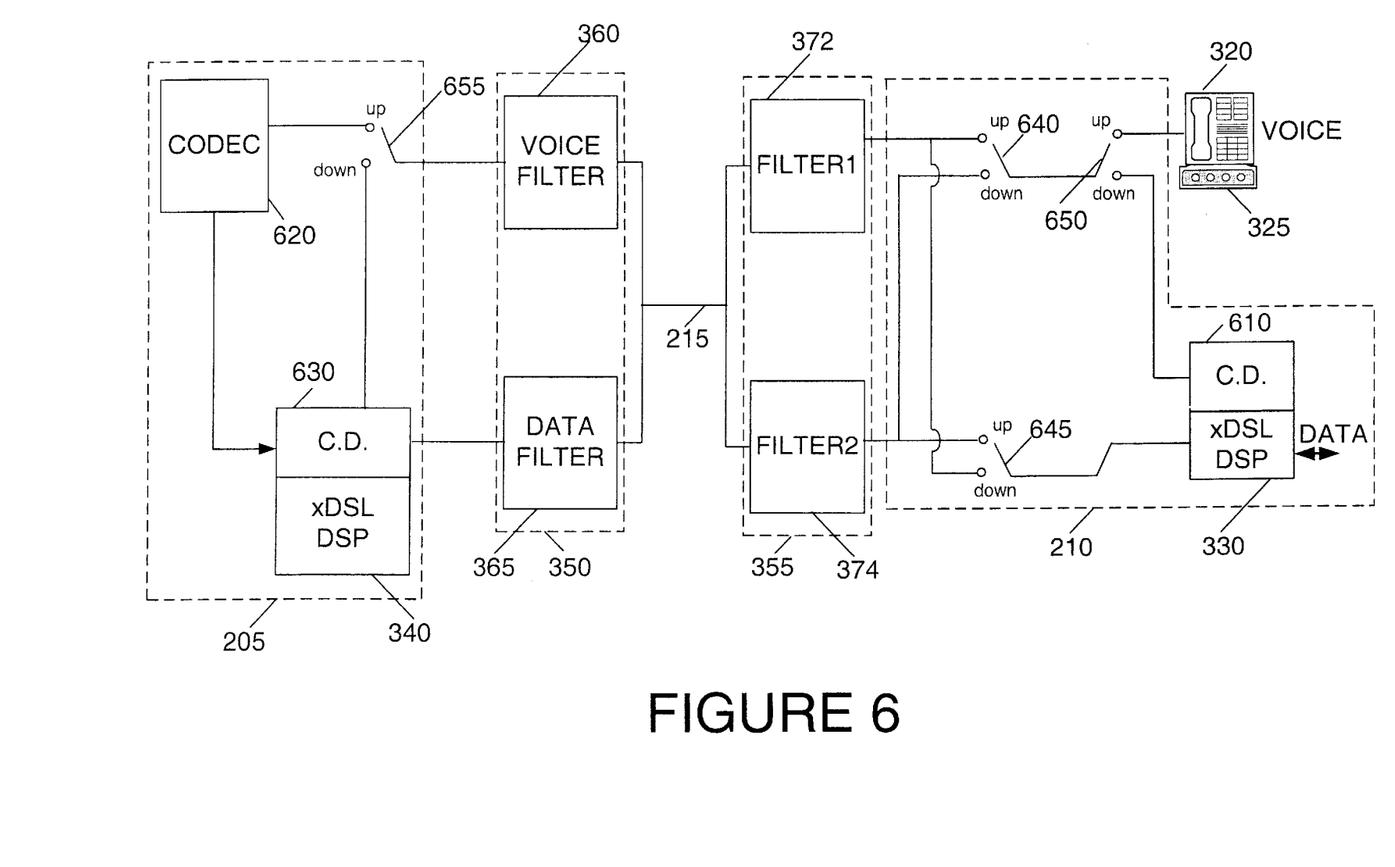
FIG. 6 is a stylized block diagram of a communications system that can employ the methods of FIGS. 4 and 5 in accordance with the present invention.

FIG. 6 illustrates an alternative embodiment of a communications system 600 with which the methods of FIG. 4 and 5 may be implemented. The host and user transceivers 205, 210 in the illustrated embodiment support voice and data communications. Accordingly, the user transceiver 210 includes an input terminal for the telephone/modem 320, 325, the first xDSL processor 330, and a first configuration device 610. The host transceiver 205 includes a CODEC 620 for processing signals from the telephone/modem 320, 325, the second xDSL transceiver 340 for processing data signals, and a second configuration device 630 for communication with the first configuration device 610. In the illustrated embodiment, the user transceiver 610 includes the first configuration device 610 that is capable of transmitting a DTMF signal in the voice band (i.e., as opposed to in the data band).

As indicated by like numerals, the host and user interfaces 205, 210 include similar first and second splitters 350, 355 to that of the communications system 300 of FIG. 3. The communications system 600 of FIG. 6 is similarly prone to incorrect installations of the first and second filters 372, 374 of the first splitter 355 (i.e., the connection to the first and second filters 372, 374 are reversed). The first splitter 355 of the user transceiver 210 includes a plurality of switching devices capable of adjusting the transmission paths of the voice and data signals. In the illustrated embodiment, the user transceiver 210 includes first, second, and third switching devices 640, 645, 650, and the host transceiver 205 includes a fourth switching device 655. The inputs of the first and second switching devices 640, 645 are connected to the telephone/modem 320, 325 and the xDSL processor 330, respectively, when the third switching device 650 is also in the "up" position. The outputs of the first and second switching devices 640, 645, as shown in their default positions (i.e., "up" position), are coupled to the first filter 372 and the second filter 374, respectively. In the "down" position, the connection to the switching devices 640, 645 is reversed such that the first switching device 640 is connected to the second filter 374 and the second switching device 645 is coupled to the first filter 372, when the third switching device 650 is in the "up" position. When the third switching device 650 is in the "down" position, the first configuration device 610 takes the place of the telephone/modem 320, 325.

The communications system 600 of FIG. 6 is capable of employing the method of FIG. 4 to verify and possibly adjust, if necessary, the transmission paths of the data and voice signals from the user transceiver 210 and its peer transceiver, the host transceiver 205. At the block 410, an enable signal is provided to the first configuration device 610 when the third switching device 650 is triggered by a user, either through software or other means. In response to the enable signal, the first configuration device 610, at block 420, transmits a preselected signal to the host transceiver 205. In the illustrated embodiment, the preselected signal is a (DTMF) sequence in the voice frequency band. At block 430, in response to the transmitting of the preselected signal, the first configuration device 610 adjusts the transmisision paths of the data and voice signals to the host transceiver 205. The CODEC 620 in the illustrated embodiment is capable of detecting the preselected signal. Upon detecting the preselected signal, the CODEC 620 provides a control signal to the second configuration device 630 and also places the fourth switching device 655 to a "down" position. It is contemplated that a variety of preselected signals can be utilized without deviating from the spirit and scope of the present invention.

The communications system 600 of FIG. 6 is capable of employing the method of FIG. 5 for adjusting the transmission paths of the data and voice signals from the user transceiver 210 to the host transceiver 205. At the block 510, the first configuration device 610 awaits a response from the second configuration device 630 in response to the preselected signal. If the first and second filters 372, 374 of the first splitter 355 are connected correctly to the telephone/modem 320, 325 and the xDSL transceiver 330, respectively, then the preselected signal should reach the second configuration device 630 successfully. Thus, assuming proper connection, the second configuration device 630, in response to the preselected signal, transmits an acknowledgement to the first configuration device 610. The first configuration device 610, at the block 520, receives the acknowledgement and verifies that a proper connection exists between the user transceiver 210 and the host transceiver 205. At the block 520, after determining that a proper connection exists, the first configuration device 610 can perform additional tests, remotely configure the host transceiver 205, or allow the host transceiver 205 to configure the user transceiver 210. If, on the other hand, the filters 372, 374 are incorrectly connected (i.e., reversed), then the preselected signal will not have reached the second configuration device 630 and, accordingly, the second configuration device 630 will not provide an acknowledgement. Assuming there is no acknowledgement from the second configuration device 630, then, at the block 540, after waiting for a preselected interval, the first configuration device 610 places the first and second switches 640, 645 in a down position, thereby switching the configuration of the filters 372, 374 of the first splitter 355. Then, at the block 420, the first configuration device 610 once again transmits a preselected signal to the second configuration device 630. Thus, if the preselected signal reaches the second configuration device 630 the second time, then the transmission paths from the user transceiver 210 to the host transceiver 205 is adjusted automatically, without any intervention from a service provider personnel.

Although the present invention has been described with respect to an upstream connection (transmission from the user transceiver 210 to the host transceiver 205), it is contemplated that the instant invention may be equally applicable with respect to a down-stream connection (i.e., transmission from the host transceiver 210 to the user transceiver 205). That is, the connectivity configuration may also be verified and corrected, if necessary, from the host transceiver to the user transceiver in accordance with the present invention. That is, a similar switching system may be employed in the host transceiver 205 to adjust the transmission path of the data and voice signals from the host transceiver 205 to the user transceiver 210.

It is contemplated that one of ordinary skilled in the art may be capable of designing and implementing the configuration devices 335 (see FIG. 3), 345, 610 (see FIG. 6), 630 in accordance with the present invention. As a result, the configuration devices 335, 345, 610, 630 will not be described in detail herein. Those skilled in the art will appreciate that the design of the configuration devices may vary from one implementation to another.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus having a first and second terminal, comprising:

a first switching device having an enable input terminal and an output terminal connected to the first terminal of the apparatus, the first switching device capable of connecting the second terminal of the apparatus in response to an enable signal;

a second switching device having an enable input terminal and an output terminal coupled to the second terminal of the of the apparatus, the second switching device capable of connecting to the first terminal of the apparatus in response to an enable signal; and a configuration device having an enable input terminal, the configuration device capable of transmitting a preselected signal over a subscriber line to a peer station and capable of providing the enable signal to the enable input terminal of the first switching device and to the enable input terminal of the second switching device.

2. The apparatus of claim 1, wherein the configuration device capable of transmitting a preselected signal includes the configuration device capable transmitting a dual tone multi-frequency sequence.

3. The apparatus of claim 2, wherein the configuration device is capable of detecting an acknowledgement of the preselected signal from the peer station in response to the preselected signal.

4. The apparatus of claim 3, wherein the configuration device is capable of providing an enable signal to the enable input terminal of the first switching device and an enable signal to the enable input terminal of the second switching device in response to not detecting an acknowledgment from the peer station.

5. The apparatus of claim 2, wherein the preselected signal is within the data frequency band.

6. The apparatus of claim 2, wherein the preselected signal is a dual tone multi-frequency sequence within a voice frequency band.

7. An apparatus, comprising:
- a CODEC capable of receiving a preselected signal over a subscriber line and capable of providing a first and second enable signal in response to receiving the preselected signal;
- a configuration device having an input terminal, the configuration device capable of providing an acknowledgement to a peer station over the subscriber line in response to receiving the first enable signal from the CODEC; and
- a switching device having an enable input terminal, the switching device capable connecting the configuration device to the subscriber line in response to receiving the second enable signal from the CODEC.

8. The apparatus of claim 7, wherein the preselected signal is dual tone multi-frequency sequence within a voice frequency band.

9. A apparatus, comprising:
- a splitter having a first and second input terminal;
- a first switching device having an enable input terminal and an output terminal connected to the first input terminal of the splitter, the first switching device capable of connecting the second terminal of the splitter in response to an enable signal;
- a second switching device having an enable input terminal and an output terminal coupled to the second terminal of the splitter, the second switching device capable of connecting to the first terminal of the splitter in response to an enable signal; and
- a configuration device having an enable input terminal, the configuration device capable of transmitting a preselected signal over a subscriber line to a peer station and capable of providing the enable signal to the enable input terminal of the first switching device and to the enable input terminal of the second switching device.

10. The apparatus of claim 9, wherein the configuration device is capable of detecting an acknowledgement of the preselected signal from the peer station in response to the preselected signal.

11. The apparatus of claim 10, wherein the configuration device is capable of providing an enable signal to the enable input terminal of the first switching device and an enable signal to the enable input terminal of the second switching device in response to not detecting an acknowledgment from the peer station.

* * * * *

UNITED STATES PATENT AND TRADEMARK OFFICE
CERTIFICATE OF CORRECTION

PATENT NO.   : 6,621,831 B1
DATED        : September 16, 2003
INVENTOR(S)  : Alfredo R. Linz It is certified that error appears in the above-identified patent and that said Letters Patent is hereby corrected as shown below:

<u>Column 2,</u>
Line 12, remove the word "Iraq".
Line 17, replace "DSL" with -- xDSL --.
Line 54, replace "CP" with -- CO --.
Line 56, replace "XDSL" with -- xDSL --.

<u>Column 5,</u>
Line 28, replace "XDSL" with -- xDSL --.

<u>Column 7,</u>
Line 26, replace "transmisision" with -- transmission --.

Signed and Sealed this

Eleventh Day of November, 2003

JAMES E. ROGAN
*Director of the United States Patent and Trademark Office*